Re 5158
11-26-1872
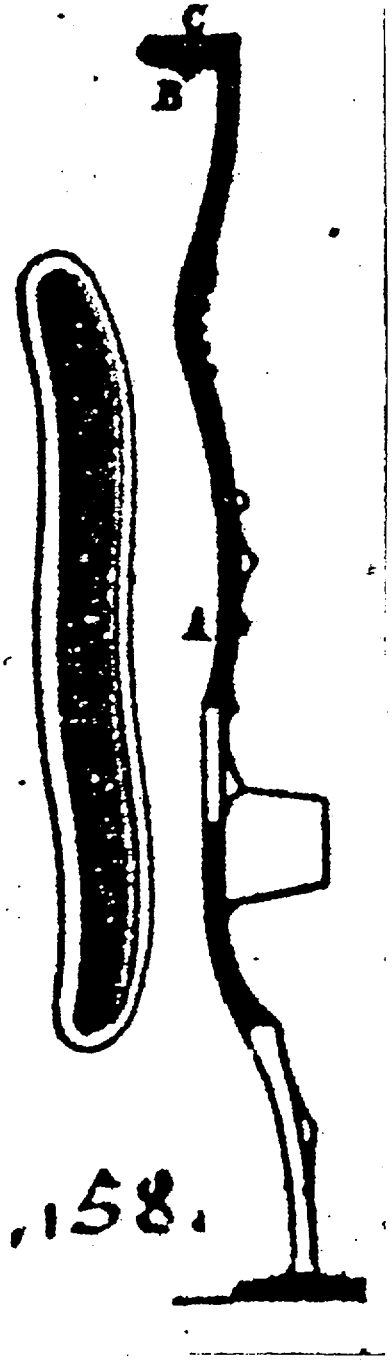
5,158.

UNITED STATES PATENT OFFICE.

GEORGE BUNTIN, OF BOSTON, MASSACHUSETTS.

IMPROVEMENT IN CAR-SEATS.

Specification forming part of Letters Patent No. 121,486, dated December 5, 1871; reissue No. 5,158, dated November 26, 1872.

*To all whom it may concern:*

Be it known that I, GEORGE BUNTIN, of Boston, county of Suffolk, State of Massachusetts, have invented an Improvement in Car-Seat Frames, of which the following is a specification:

The object of my invention is two-fold: first, a durable, neat, and economical substitute for the ordinary arm-rests of car-seats; and, second, a car-seat frame, arm, and arm-rest combined in such a manner as to insure economy of construction.

I attain the first of these objects by substituting for the usual wooden arm-rest the metallic plate C shown in the perspective view, Figure 1, of the accompanying drawing; and the second by combining this plate C with a frame, A, which serves both as one of the supports of the seat and as the arm for receiving the rest, as shown in the vertical section, Fig. 2.

Heretofore the arm-rests of car-seats have been composed of wood alone or of wood covered with a suitable upholstering material. In place of the usual wooden arm-rests, which are easily fractured and defaced, and in place of the plush-covered rests, which soon become worn and unsightly, I use one of metal—by preference, cast-iron—polished and nickel-plated, by which a brilliant finish is imparted to it; and it may be made still more attractive by ornamental figures in relief, the upper surfaces of these figures being burnished or otherwise finished, while the depressions remain unfinished.

The rest-plate, which can be made at a very low cost, not only imparts a pleasing effect to the interior of the car, but it will retain its original appearance throughout years of service.

The end frame A is cast in one piece, extending from the floor to the rest, the upper portion taking the place of the usual wooden arm, while the lower portion has suitable projections or lips to which are attached the usual cross-bars. The extreme upper edge of the frame has a flange, B, to which the above-described arm-rest is attached by screw-pins and nuts, or otherwise. Thus in two castings are comprised one of the supports for the seat, an arm to take the place of that usually made of wood, and an arm-rest.

I claim as my invention—

1. The within-described metallic arm-rest for railway-car seats.

2. The combination of said rest with the frame A, substantially as described.

In testimony whereof I have signed my name to this specification in the presence of two subscribing witnesses.

GEORGE BUNTIN.

Witnesses:

JOHN HUNNEWELL,

A. J. BLANCHARD.